United States Patent
Gandhi et al.

(10) Patent No.: US 12,470,322 B2
(45) Date of Patent: Nov. 11, 2025

(54) DYNAMIC INTERFERENCE RESPONSE IN WIRELESS LOCAL AREA NETWORKS

(71) Applicant: Cisco Technology, Inc., San Jose, CA (US)

(72) Inventors: Indermeet S. Gandhi, San Jose, CA (US); Malcolm M. Smith, Richardson, TX (US); Jerome Henry, Pittsboro, NC (US)

(73) Assignee: Cisco Technology, Inc., San Jose, CA (US)

( * ) Notice: Subject to any disclaimer, the term of this patent is extended or adjusted under 35 U.S.C. 154(b) by 276 days.

(21) Appl. No.: 18/173,502

(22) Filed: Feb. 23, 2023

(65) Prior Publication Data
US 2024/0291590 A1 Aug. 29, 2024

(51) Int. Cl.
*H04L 1/00* (2006.01)
*H04B 17/336* (2015.01)

(52) U.S. Cl.
CPC ......... *H04L 1/0068* (2013.01); *H04B 17/336* (2015.01)

(58) Field of Classification Search
CPC .............................. H04L 1/0068; H04B 17/336
See application file for complete search history.

(56) References Cited

U.S. PATENT DOCUMENTS

| | | | | |
|---|---|---|---|---|
| 9,119,082 B1* | 8/2015 | Gomadam | ............ | H04L 5/0048 |
| 2012/0087261 A1 | 4/2012 | Yoo et al. | | |
| 2014/0086355 A1* | 3/2014 | Liu | .................... | H03H 21/0027 |
| | | | | 375/285 |
| 2015/0003270 A1* | 1/2015 | Jamadagni | .......... | H04W 72/541 |
| | | | | 370/252 |
| 2016/0183220 A1* | 6/2016 | Rashid | .................. | H04W 72/23 |
| | | | | 370/329 |
| 2019/0261369 A1 | 8/2019 | Verma et al. | | |
| 2020/0107214 A1 | 4/2020 | Vlachou et al. | | |
| 2021/0258100 A1* | 8/2021 | Hassan | ................. | H04L 5/0091 |
| 2022/0124711 A1* | 4/2022 | Zhou | ..................... | H04W 28/26 |
| 2022/0141825 A1 | 5/2022 | Malladi | | |
| 2022/0295490 A1 | 9/2022 | Erceg et al. | | |
| 2022/0376824 A1* | 11/2022 | Sun | ........................ | H04L 1/1614 |
| 2023/0171029 A1* | 6/2023 | Abotabl | ................ | H04W 72/23 |
| | | | | 370/329 |
| 2023/0209584 A1* | 6/2023 | Rahman | ............ | H04W 72/1215 |
| | | | | 455/452.1 |
| 2023/0397178 A1* | 12/2023 | Li | ......................... | H04L 5/0007 |
| 2024/0260086 A1* | 8/2024 | Chu | .................. | H04W 72/0446 |

OTHER PUBLICATIONS

Android Open Source Project "Wi-Fi/Cellular Coex Channel Avoidance," Source: Core Topics, Dated: Oct. 11, 2022, pp. 1-20.

* cited by examiner

*Primary Examiner* — Zhiren Qin
(74) *Attorney, Agent, or Firm* — Patterson + Sheridan, LLP

(57) ABSTRACT

An unsafe frequency report from a client device is received, the unsafe frequency report indicating that the client device is experiencing interference on a set of frequencies. A set of safe frequencies is identified, for the client device, based on interference indicated in the unsafe frequency report, and dynamic puncturing is performed based on the unsafe frequency report, comprising identifying an allocation of wireless resources for the client device during a transmission opportunity based on the set of safe frequencies, where the allocation of wireless resources punctures one or more of the set of frequencies, and communicating with the client device using the allocation of wireless resources.

20 Claims, 7 Drawing Sheets

DYNAMIC INTERFERENCE RESPONSE IN WIRELESS LOCAL AREA NETWORKS

TECHNICAL FIELD

Embodiments presented in this disclosure generally relate to wireless networks. More specifically, embodiments disclosed herein relate to dynamic interference mitigations in wireless networks.

BACKGROUND

Increasingly, multiple wireless networks co-exist in the same frequency bands and physical locations. For example, wireless local area networks (WLANs) often overlap with cellular technologies (e.g., where cellular networks such as LTE-U/NR-U in 5 Ghz/6 Ghz overlap with the frequency bands used by some WLANs such as Wi-Fi networks). This can result in interference to the client devices. On any given channel, some client devices may receive signals via one network or technology while others receive signals via another. Such interference can become particularly severe for individual dual-capability client devices when one antenna is transmitting (e.g., an NR-U signal) while another is receiving at the same time from a competing technology (e.g., Wi-Fi). In these cases, the transmitting antenna can flood the receiving antenna, significantly affecting its reception quality, even if the client is intended to support both technologies concurrently.

Conventional systems are not equipped or capable of providing adequate and dynamic interference mitigation in modern networks.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1:
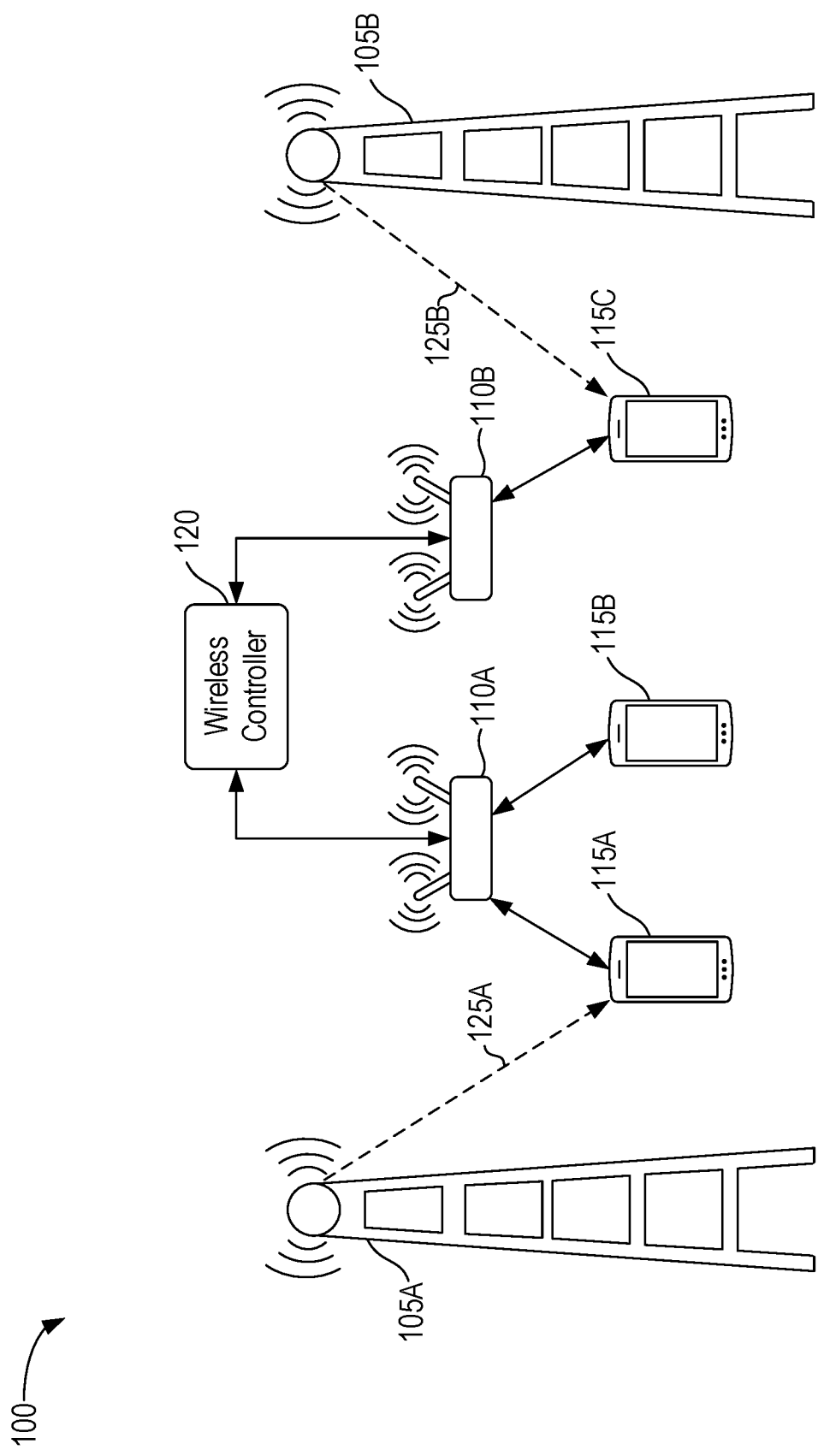
FIG. 1 depicts an example environment for dynamic interference mitigation via frequency puncturing, according to some embodiments of the present disclosure.

One embodiment presented in this disclosure provides a method, including receiving, by a wireless access point (AP), a first unsafe frequency report from a first client device, the first unsafe frequency report indicating that the first client device is experiencing interference on a first set of frequencies; identifying, for the first client device, a set of safe frequencies based on interference indicated in the first unsafe frequency report; and performing dynamic puncturing based on the first unsafe frequency report, comprising: identifying an allocation of wireless resources for the first client device during a first transmission opportunity based on the set of safe frequencies, wherein the allocation of wireless resources punctures one or more of the first set of frequencies; and communicating with the first client device using the allocation of wireless resources.

Other embodiments in this disclosure provide non-transitory computer-readable mediums containing computer program code that, when executed by operation of one or more computer processors, performs operations in accordance with one or more of the above methods, as well as systems comprising one or more computer processors and one or more memories containing one or more programs which, when executed by the one or more computer processors, performs an operation in accordance with one or more of the above methods.

Example Embodiments

Embodiments of the present disclosure provide techniques for interference mitigation via dynamic frequency puncturing in wireless networks.

In some embodiments, client devices may be uniquely situated to best detect and respond to interference, as compared to infrastructure components. For example, although WLAN infrastructure can, in some cases, detect or infer the presence of the interfering technology, the WLAN generally does not have the same view as the client devices and has no knowledge of whether transmissions are actually causing interference at the client device. Conventional approaches generally fail to provide adequate interference mitigation. For example, one conventional solution is for the client device to turn off or disable the cellular radio in an effort to limit interference to co-located WLAN radios, but this is not particularly practical and does not solve the concern (for example, such approaches are unclear as to when the device can or should re-enable the radio).

In some embodiments, in a given area or deployment, cellular systems generally do not hop around or change channels frequently. Instead, many cellular networks (and other networks) tend to pick a set of one or more channels/frequencies, and use these selected channels until their own interference algorithms determine that a change is needed. Additionally, in some embodiments, the channels used by some other networks (such as cellular systems) are not wide, as compared to channel bandwidth that can be used by WLAN (e.g., Wi-Fi) systems. For example, cellular NR-U may operate only in 20 MHz, 40 MHz, or 80 MHz channels while Wi-Fi access points (APs) may operate with much higher bandwidths (e.g., 320 MHz or 160 Mhz).

In some embodiments, therefore, client devices can detect interference/generate a list of unsafe channels (e.g., where the cellular network is operating) and report these unsafe (cellular) channels to the WLAN infrastructure (e.g., indicating specific frequencies covered by these in-use channels). In response, the WLAN infrastructures can adopt dynamic puncturing in those frequencies, such as by puncturing only the narrower bandwidths used by the cellular network, rather than avoiding entire WLAN channels. In some embodiments, this puncturing may be referred to as "dynamic" to indicate that it can be performed within channels (e.g., for specific frequency ranges within a broader channel) rather than puncturing the entire channel, and/or to indicate that it can be performed on a per-client basis (e.g., performing different puncturing for different clients based on their local interference/unsafe frequencies, and potentially not puncturing at all for some clients). That is, rather than using narrower channels or switching channels to avoid interference, the AP may use dynamic puncturing to avoid or mitigate interference.

In embodiments, client devices can detect interference using a variety of techniques. Generally, the interference is caused by shared use of the wireless spectrum by multiple networks. In embodiments, this may include overlapping use (e.g., use of the same frequencies), as well as use within short frequency separation (e.g., neighboring channels) and/or when there is harmonic and intermodulation interference between the RF usage.

For example, when the client device is connected to a WLAN AP which is operating in an overlapping channel (or the cellular network has changed its channel), the client device may detect and report this change. In some embodiments, the client device uses one or more interference avoidance technologies (e.g., Coex Channel Interference Avoidance (CCIA) algorithms) to identify/quantify the interference between cellular and WLAN channels. In an embodiment, the client device can thereafter create a new report (e.g., an event report action frame) containing a list of unsafe frequencies (e.g., frequencies experiencing interference and/or in use by the cellular or other network). For example, a new event type (e.g., an 802.11k event) can be used for the unsafe frequencies reporting. In some embodiments, this report may be sent unsolicited (e.g., by the client device without any specific request or inquiry from the AP), and/or may be sent in response to an AP query, such as a query to report on detected APs (e.g., an 802.11k beacon report) a query specifically to report unsafe frequencies, and the like. In some embodiments, the unsafe frequency report is transmitted to the AP upon association. That is, when the client device associates to an AP, the client device may automatically transmit an unsafe frequency report to the AP to indicate its current interference state.

In some embodiments, therefore, the AP can receive the set of unsafe frequencies causing interference at the client. In an embodiment, the set of unsafe frequencies may cover a segment of the AP's active channel(s) (e.g., to which the client is associated), a segment of the AP's other channel(s) (e.g., other radio(s) on the same AP), or other channels entirely (e.g., channels used by other AP(s)). In some embodiments, the AP can evaluate the severity of the interference reported (which may be expressed in the report) and/or evaluate the count or number of clients that may be (or are) affected (e.g., based on the client table and their channel width support). In some embodiments, the AP can then uses this information to decide dynamic puncturing when transmitting towards the affected client devices.

For example, in some embodiments, the knowledge of affected channels can be used by the AP when allocating and/or using wireless resources (e.g., transmission opportunities (TxOPs)) by puncturing unsafe frequencies for the reporting client devices. In some embodiments, in a multi-AP environment, a multi-AP coordination function (MAPC) may allocate the wireless resources by dynamically puncturing unsafe frequencies for the reporting client devices across multiple APs.

In some embodiments, the AP may periodically collect or determine "unsafe frequencies" from the client devices. That is, the AP may transmit queries or requests for updated unsafe frequency reports. In some embodiments, the client devices may provide such unsafe frequency reports automatically (e.g., upon association to the AP).

In some embodiments, if/when cellular channels are changed or interference otherwise changes, the detection of that change on the client device can be used to trigger an unsolicited report to the AP. (e.g., where the previously affected frequencies can be marked as safe) and such dynamically puncturing may be deactivated (at least for the newly safe channels) and/or activated (for newly unsafe channels). Additionally, in some embodiments, for any client devices that do not report interference (e.g., due to residing in a different physical location, due to better antenna separation, and the like), the AP may use the full channel bandwidth (e.g., without puncturing) during its transmission with such client devices.

FIG. 1 depicts an example environment 100 for dynamic interference mitigation via frequency puncturing, according to some embodiments of the present disclosure. In the illustrated example, a first wireless system is represented/supported by base stations 105A and/or 105B, while a second wireless system is represented/supported by APs 110A and/or 110B. For example, the base stations 105 may correspond to base stations used in wide area networks (WANs) (e.g., cellular networks), such as a Node B, an Evolved Node B (eNB), and/or a Next Generation Node B (gNB). Generally, the base stations 105 can represent any wireless system that uses one or more portions of a radio frequency (RF) spectrum. In some embodiments, the use of the wireless spectrum by the base stations 105 may be referred to as "licensed" use to indicate that a regulatory entity (e.g., the Federal Communications Commission (FCC)) has granted permission (e.g., a license) for the base stations 105 to use one or more wireless resources (e.g., portions of the spectrum). In some embodiments, the base stations 105 may similarly be referred to as the incumbent user of the spectrum.

The APs 110 are generally representative of one or more wireless local area networks (WLANs), such as a Wi-Fi system, which also uses one or more portions of the RF spectrum. For example, the APs 110 may provide wireless communication and connectivity for nearby devices. In the illustrated embodiment, at least a portion of the spectrum used by the APs 110 overlaps or is sufficiently close to at least a portion of the spectrum used by the base stations 105 such that interference is possible. For example, both the base stations 105 and APs 110 may operate at least partially in a 6 GHz band. In some aspects, the wireless spectrum use by the APs 110 may be referred to as "unlicensed" use to indicate that no regulatory entity has granted exclusive permission for the APs 110 to use the one or more wireless resources (e.g., portions of the spectrum).

Although two base stations 105 and APs 110 are depicted for conceptual clarity, in embodiments, there may be any number and variety of base stations 105 and APs 110. For example, in a given geographic area, there may be multiple base stations 105 serving one or more cellular networks/WANs. Similarly, there may be one or more APs 110 corresponding to one or more deployments/WLANs.

The depicted environment 100 further includes a number of client devices 115A-C. Though three such client devices 115 are depicted for conceptual clarity, there may be any number and variety of client devices 115. Generally, the client devices 115 may be communicatively coupled with the base stations 105, APs 110, or both. For example, one or more of the client devices 115 may be smartphones capable of communicating with the base stations 105 (e.g., via a cellular network) as well as with the APs 110 (e.g., via a Wi-Fi network).

As discussed above, if the base station(s) 105 and AP(s) 110 communicate using overlapping wireless spectrum, there may be interference between them. That is, devices (such as the base stations 105 and APs 110 themselves, as well as any client devices 115) may experience interference between the distinct networks, which can have a significant negative impact on the device and network stability, throughput, and efficiency. In the illustrated embodiment, therefore, the APs 110 may use dynamic frequency puncturing to avoid or mitigate such interference.

In the illustrated example, the APs 110 are controlled or managed at least partially by a wireless controller 120, which may manage the operations of the WLAN. Although the illustrated example depicts a discrete wireless controller 120, the management operations of the wireless controller 120 may be implemented by any device or system, and may be combined or distributed across any number of systems. For example, in some aspects, the wireless controller 120 is a WLAN controller (WLC) for a deployment of APs 110. In some embodiments, the wireless controller 120 is implemented on an AP 110 itself. The wireless controller 120 may generally be implemented using hardware, software, or a combination of hardware and software.

In the illustrated environment 100, one or more of the client devices 115 may be configured to perform interference detection and/or quantification in order to generate unsafe frequency reports. Generally, as discussed above, the client devices 115 may use a variety of techniques and technologies to detect the interference. In the illustrated example, as depicted by arrows 125A and 125B, the base stations 105 are causing interference for the client devices 115A and 115C. However, as depicted, the client device 115B is not currently experiencing such interference.

Therefore, in some embodiments, each of the client devices 115A and 115C may report unsafe frequencies at the channel(s) used by the base stations 105A and 105B, respectively. Specifically, the client device 115A may report, to the AP 110A, that the frequencies used by the base station 105A are "unsafe" or subject to interference. Similarly, the client device 115C may report, to the AP 110B, that the frequencies used by the base station 105B are "unsafe" or subject to interference. However, as the client device 115B is not experiencing contention, it may refrain from sending an unsafe frequency report, or may send a report indicating on unsafe frequencies.

In some embodiments, the APs 110A-B may share the unsafe frequency reports (e.g., via the wireless controller 120). For example, the APs 110 and/or wireless controller 120 may aggregate the reports to determine, for each reported unsafe frequency, the average or representative magnitude or severity of the interference (e.g., as reported in the unsafe frequency reports), the number of client devices 115 that are or may be experiencing the interference (e.g., based on the number that actually reported it, and/or based on the number that use the indicated frequency), and the like.

In some embodiments, if a given AP 110 receives a report of an unsafe frequency that is used by the given AP 110, the AP 110 may take various actions, such as dynamic puncturing of the unsafe frequencies (at least with respect to the affected client device(s)). This may include, for example, puncturing the indicated frequencies when communicating with client devices 115 that reported the frequency as unsafe.

In some embodiments, if a given AP 110 receives a report of an unsafe frequency that is not used by the given AP 110, the AP 110 may nevertheless take various actions, such as storing the interference report for subsequent use. In at least one embodiment, the AP 110 may share the report with the wireless controller 120 and/or other APs 110, enabling these other devices to take appropriate steps. For example, if the client device 115A indicates, to the AP 110A, that a given frequency used by the AP 110B is unsafe, the AP 110A may forward the unsafe frequency report to the wireless controller 120 and/or AP 110B. In this way, if the AP 110B subsequently begins communicating with the client device 115A, the AP 110B may determine to dynamically puncture the indicated frequencies.

In some embodiments, communicating with puncturing the set of frequencies can be accomplished using a variety of techniques. For example, the AP 110 may use a bit filter to notch out a portion of the (relatively wider) channel corresponding to the unsafe frequencies. This can reduce or eliminate interference with the coexisting network. In at least some embodiments, the AP 110 may indicate this puncturing to the client device 115 (e.g., indicating which frequencies are being punctured). In other embodiments, the client device 115 may detect or infer the puncturing based on the received signal.

In some embodiments, in addition to the AP 110 puncturing the frequencies when transmitting data from the AP 110 to the client device 115 (e.g., in the downlink direction), the client device 115 may also puncture the corresponding frequencies when transmitting data to the AP 110 (e.g., in the uplink direction).

In this way, the client devices 115 and APs 110 may perform dynamic puncturing, efficiently mitigating or eliminating interference with coexisting networks (such as a cellular network provided by base stations 105A and 105B). This can improve the stability and throughput of the WLAN, as well as improving the stability of the cellular network. Additionally, such dynamic puncturing can generally improve the operations of the WLAN infrastructure and client devices themselves, such as by reducing lost packets and wasted computational resources due to interference.

Figure 2:
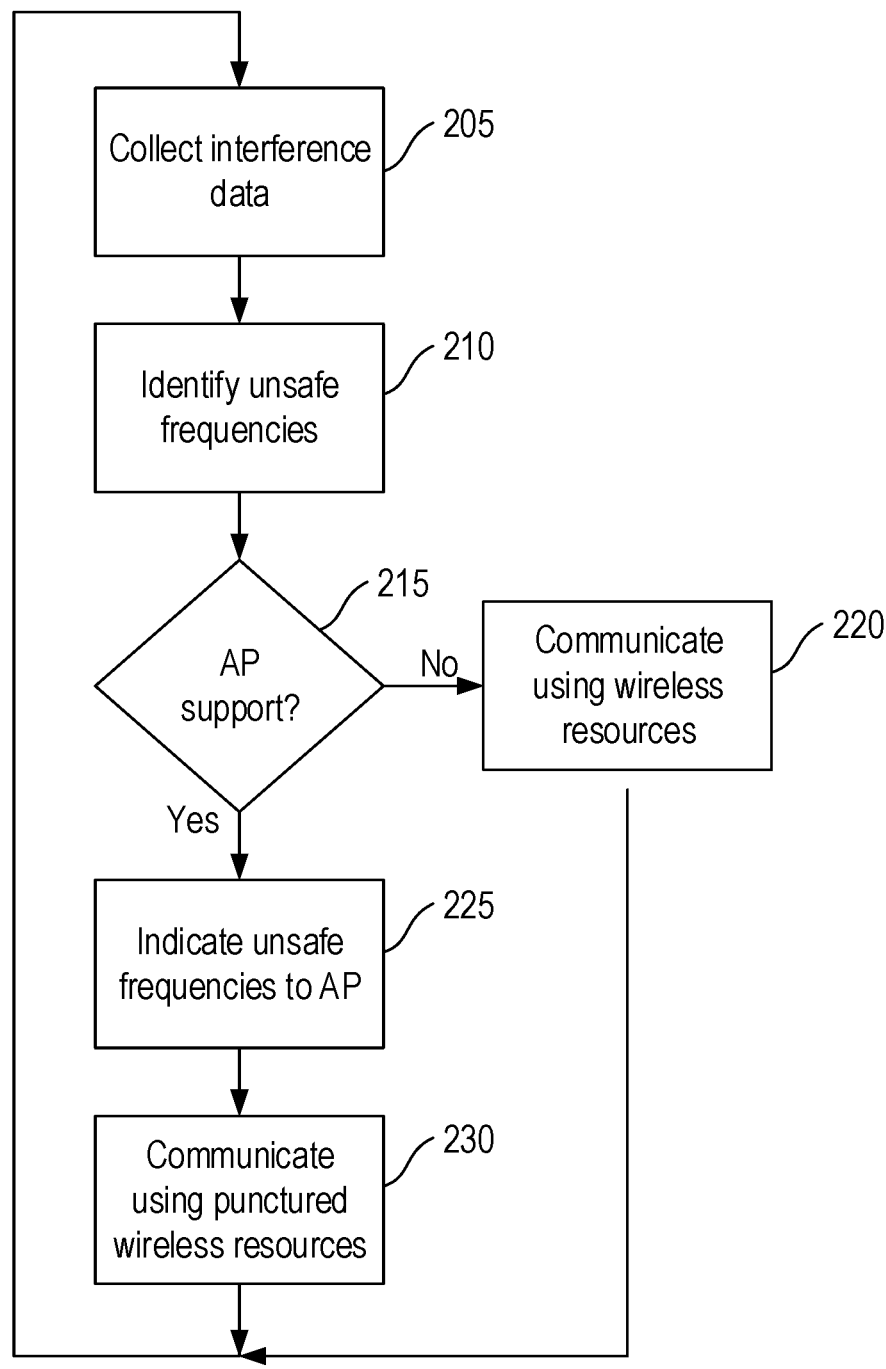
FIG. 2 is a flow diagram depicting an example method for detecting and mitigating interference using puncturing, according to some embodiments of the present disclosure.

FIG. 2 is a flow diagram depicting an example method 200 for detecting and mitigating interference using puncturing, according to some embodiments of the present disclosure. In some embodiments, the method 200 is performed by a client device, such as a client device 115 of FIG. 1.

At block 205, the client device collects interference data for one or more channels or frequencies of an RF spectrum used by the client device. For example, the client device may be a smartphone or other device capable of using two or more radios or network technologies (or otherwise connecting to two networks), such as a cellular network and a WLAN network. In some embodiments, the client device detects interference to one network (e.g., to WLAN communications) by identifying which channels or frequencies are being used by another network (e.g., the cellular network). In some embodiments, the client device detects the interference based on communications with one network (e.g., the WLAN) without connecting to or evaluating other networks. That is, the client device may identify or detect interference based on evaluating metrics (e.g., channel state information) of its link on the WLAN network (such as the noise, signal-to-noise ratio, signal strength, and the like).

At block 210, the client device identifies any unsafe frequencies based on the collected interference data. For example, in some embodiments, the client device can identify the specific channel(s) (e.g., range(s) of frequencies) that are being used by the cellular or other network. Using various formulas or rules, the client device can thereby identify any WLAN channels that are (or may be) affected by the cellular system, such as due to overlapping use, neighboring use, harmonic or intermodulation effects, and the like. In some embodiments, identifying the unsafe frequencies includes determining whether the interference is sufficiently high. That is, the client device and/or AP may determine whether the detected interference meets or exceeds one or more thresholds or other criteria in order to determine whether the frequency is "unsafe" or "safe." In some embodiments, identifying unsafe frequencies includes identifying specific frequencies (e.g., portions of one or more channels), rather than simply identifying WLAN channels. That is, rather than identifying an entire channel as unsafe, the client device may determine or infer that a subset of the channel (e.g., specific frequencies in the channel) are unsafe.

At block 215, the client device determines whether the AP to which it is associated/connected supports reporting of unsafe frequencies. For example, this support may be indicated in beacons transmitted by the AP, in response to a query from the client device, and the like.

If the AP does not support unsafe frequency reporting, the method 200 continues to block 220, where the client device communicates with the AP using allocated wireless resources, as normal (e.g., without puncturing). In some embodiments, the client device can optionally use various techniques to mitigate interference without reporting unsafe frequencies, such as by attempting to avoid the unsafe frequencies, expressing preference to not use the corresponding channels (or preference to use indicated safe channels), and the like. The method 200 then returns to block 205.

If, at block 215, the client device determines that the AP supports reporting of unsafe frequencies, the method 200 continues to block 225. At block 225, the client device indicates the determined set of unsafe frequencies to the AP. For example, as discussed above, the client device may report the unsafe frequencies in an event report action frame. In some embodiments, the client device reports the unsafe frequencies spontaneously (e.g., without receiving a query from the AP). For example, the client device may periodically transmit the unsafe frequency report, transmit updated reports whenever conditions change (e.g., interference levels change or the cellular network starts using a different set of frequencies), and the like. In some embodiments, the client device may additionally or alternatively report the unsafe frequencies in response to a query or request from the AP.

At block 230, the client device communicates with the AP using punctured wireless resources, as discussed above. For example, the AP may determine to puncture the unsafe frequencies when communicating with the client device. In at least one embodiment, puncturing the unsafe frequencies includes using the WLAN channel(s) normally (e.g., not avoiding any specific channels) while masking or filtering the specific frequencies that were reported as unsafe. That is, the AP may use any technique to allocate or schedule resources for communication with the client device, and if a channel that includes or overlaps with unsafe frequencies is selected, the AP may mask these unsafe frequencies while using the remainder of the channel to communicate with the client device.

In some embodiments, as discussed above, the AP may indicate the specific frequencies that are being punctured (e.g., via a beacon, in the header of one or more packets, and the like). In some embodiments, the client device may determine or infer which frequencies are being punctured (e.g., based on the reported unsafe frequencies, based on the structure of the received signals, and the like). In some embodiments, in addition to receiving punctured signals, the client device can also transmit punctured signals to the AP. That is, communicating using punctured resources may include both receiving and transmitting data using puncturing to filter or mask one or more unsafe frequencies. The method 200 then returns to block 205.

Figure 3:
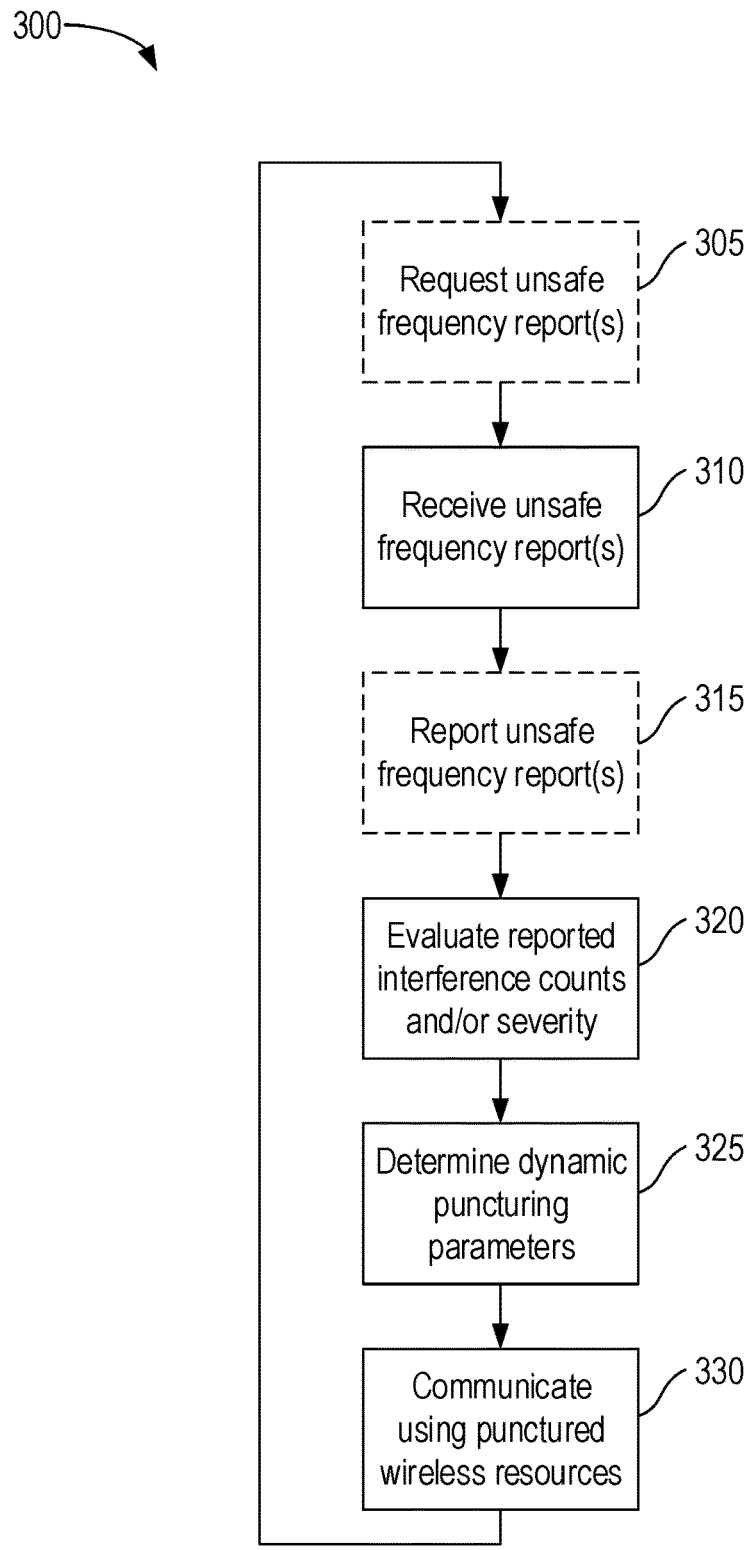
FIG. 3 is a flow diagram depicting an example method for mitigating interference via frequency puncturing, according to some embodiments of the present disclosure.

FIG. 3 is a flow diagram depicting an example method 300 for mitigating interference via frequency puncturing, according to some embodiments of the present disclosure. In some embodiments, the method 300 is performed by an AP, such as an AP 110 of FIG. 1.

At block 305, the AP can optionally request unsafe frequency report(s) from connected or associated client devices. That is, as discussed above, the AP may query the client devices to report unsafe frequencies (e.g., periodically). In some embodiments, as discussed above, the client devices may additionally or alternatively provide unsafe frequency reports according to other criteria, such as when conditions change.

At block 310, the AP receives one or more unsafe frequency reports from one or more client devices. Generally, each unsafe frequency report can indicate zero or more sub-bands (e.g., specific ranges of frequency) experiencing interference, from the perspective of the client device. That is, a given unsafe frequency report may indicate zero such sub-bands (e.g., indicating that there are no unsafe frequencies), or may indicate one or more specific sub-bands.

In some embodiments, each unsafe frequency report may additionally or alternatively quantify or indicate the severity of the interference for each set of frequencies. That is, the client device may indicate, for one or more frequencies or channels, the level or amount of interference.

At block 315, the AP can optionally report or forward the unsafe frequency report(s) to one or more other systems, such as a wireless controller (e.g., a multi-AP coordinator or controller), one or more other APs, and the like. For example, in some embodiments, the wireless controller can aggregate unsafe frequency reports from multiple APs to provide dynamic puncturing across the multiple APs. In some embodiments, the AP may forward the unsafe frequency report to another AP that uses one or more of the indicated unsafe frequencies.

At block 320, the AP evaluates the reported interference severity and/or counts based on the received unsafe frequency reports. For example, as discussed above, the AP may determine, for each frequency (or sub-band of frequencies), the count of devices (e.g., the number of clients) that report the frequency as unsafe and/or the aggregate severity reported (e.g., the average, the median, the maximum, and the like) for the frequency. In some embodiments, based on this aggregated data, the AP can better determine how to drive dynamic puncturing when transmitting data toward the affected devices.

In some embodiments, the AP uses the aggregated data to validate or confirm individual reports. For example, if two client devices that are similarly situated (e.g., in or near the same physical region, having the same or similar hardware, design, or construction, and the like), the AP may determine whether the unsafe frequency reports from each are similar. If not, the AP may infer that one (or both) of the devices is sending spurious interference reports (either maliciously, or due to mistake or misconfiguration).

In one such embodiment, the AP may determine not to use dynamic puncturing for the client device that provided the spurious report. For example, if one client reports one or more frequencies as unsafe, but no other clients indicate interference on these frequencies, the AP may infer that the frequencies are, in fact, safe (or that any problems reside within the client device, and would not be resolved by dynamic puncturing). In response, therefore, the AP may determine not to rely on the report provided by the one client device.

At block 325, the AP determines dynamic puncturing parameters based on the unsafe frequency reports. In some embodiments, as discussed above and in more detail below, these dynamic puncturing parameters can include device-specific parameters (e.g., different puncturing for each client device) and/or frequency-specific parameters (e.g., puncturing sub-bands or specific frequencies within one or more channels, rather than puncturing or eliminating the entire broad channel).

In some embodiments, the AP may determine these parameters based on the individual unsafe frequency reports (e.g., puncturing the indicated unsafe frequencies for each client) and/or based on the aggregated reports (e.g., puncturing the frequencies suffering the most severe aggregate interference, or puncturing frequencies only if multiple client devices report them as unsafe and/or only if the report from one client is not contradicted by a report from another). In at least some embodiments, as discussed above, the AP may evaluate the unsafe frequency report(s) to determine whether the indicated interference meets or exceeds some threshold criteria. That is, the reportedly "unsafe" frequencies may be deemed "safe" by the AP if the interference is sufficiently low, in some embodiments.

At block 330, the AP then communicates with the client devices using punctured resources, as discussed above. For example, the AP may indicate, to each client device, the specific frequencies being punctured. The AP may use a bit mask or filter to puncture these specific frequencies within the affected channel(s), such that downlink data (transmitted from the AP to the client device) is punctured appropriately. Similarly, the client device may use a mask or filter to puncture the specific frequencies in the uplink direction, such that data transmitted from the client device to the AP is appropriately punctured. The method 300 then returns to block 305.

Figure 4:
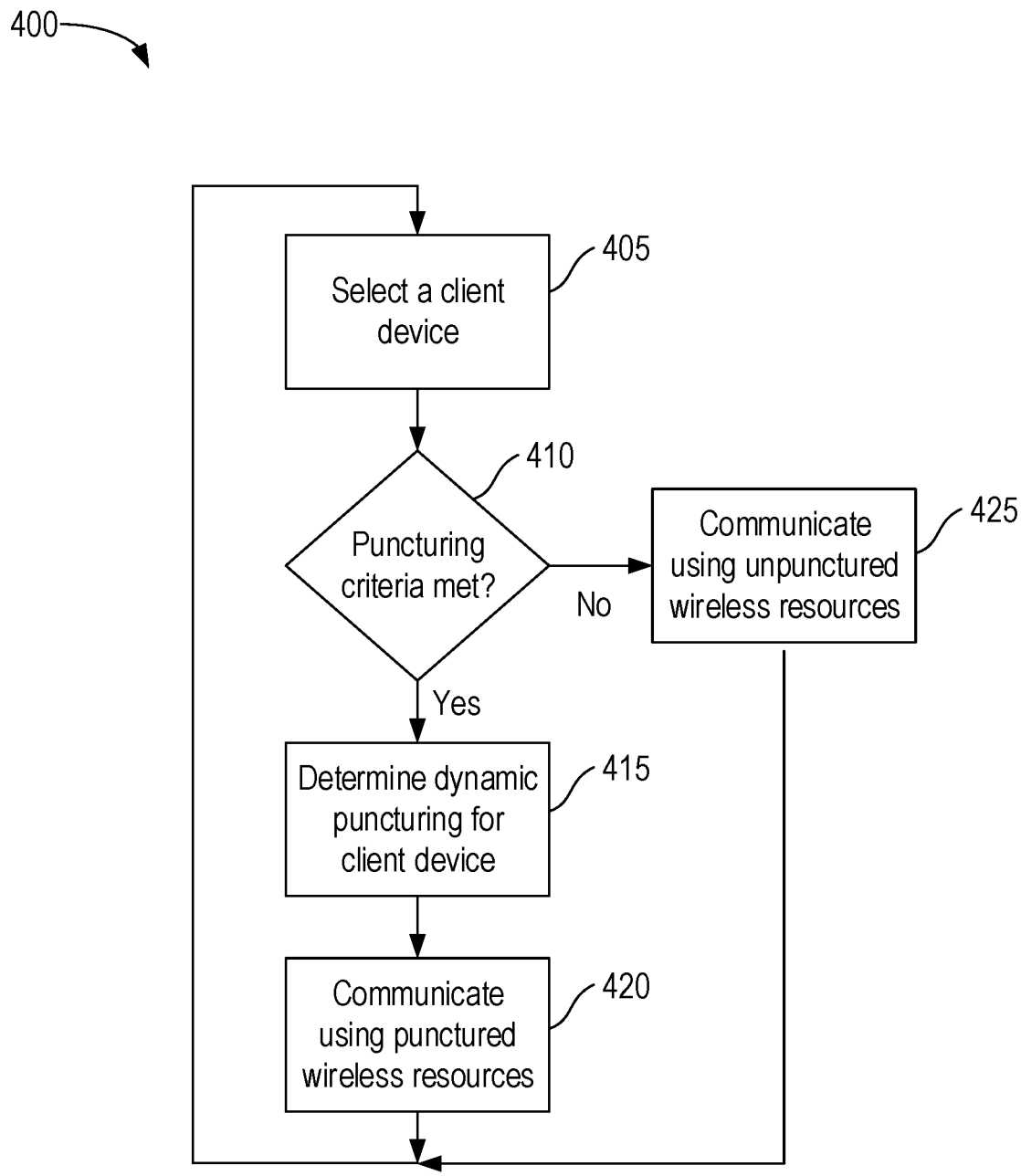
FIG. 4 is a flow diagram depicting an example method for dynamic puncturing for interference mitigation, according to some embodiments of the present disclosure.

FIG. 4 is a flow diagram depicting an example method 400 for dynamic puncturing for interference mitigation, according to some embodiments of the present disclosure. In some embodiments, the method 400 is performed by an AP, such as an AP 110 of FIG. 1. In some embodiments, the method 400 provides additional detail for block 330 of FIG. 3.

At block 405, the AP selects one of the associated/connected client devices. Generally, the AP may select the client device using any suitable criteria or technique, as all client devices connected/associated to the AP will be selected and evaluated during the method 400. In some embodiments, the AP selects the client device from among a set of devices that are scheduled to transmit or receive data. That is, the AP may use transmission scheduling (e.g., scheduling TxOPs) to allocate resources to the client devices (e.g., allocating one or more specific resources, such as a channel, sub-channel, physical layer protocol data unit (PPDU), and/or resource unit (RU)) during a specific time period (e.g., during a given TxOP) to allow the client device to transmit or receive data using the resources during the TxOP. In one such embodiment, for an upcoming transmission opportunity, the AP may identify the set of client devices that have been allocated resources, and select one of these clients.

At block 410, the AP determines whether one or more puncturing criteria are met with respect to the selected client device. For example, as discussed above, the AP may determine whether the selected client indicated any unsafe frequencies, whether the indicated interference is sufficiently severe, and the like. If the puncturing criteria are not met, the method 400 continues to block 425, where the AP communicates with the selected client device (e.g., using the assigned resources during the TxOP) without puncturing. The method 400 then returns to block 405.

Returning to block 410, if the AP determines that the puncturing criteria are met, the method 400 continues to block 415, where the AP determines the dynamic puncturing parameters for the selected device. That is, the AP can determine which specific frequencies should be punctured for the specific client device at the specific time. At block 420, the AP then communicates with the selected client device using the allocated resources with appropriate puncturing, as discussed above. The method 400 then returns to block 405.

In this way, the AP can provide client-specific dynamic puncturing. Although the illustrated example depicts a sequential process (e.g., selecting and communicating with each client device in turn), in some embodiments, some or all of the illustrated blocks of the method 400 may be performed in parallel. Additionally, though not depicted in the illustrated example, in some embodiments, the AP may use the method 400 for each transmission opportunity. For example, the AP may allocate resources for a coming TxOP, and use the method 400 to carry out appropriate puncturing.

In this way, the AP can provide dynamic puncturing that can reduce the burdens on the participating devices, reduce interference on the WLAN (as well as on the cellular system), and generally substantially improve the operations of the WLAN infrastructure and the participating client devices.

Figure 5:
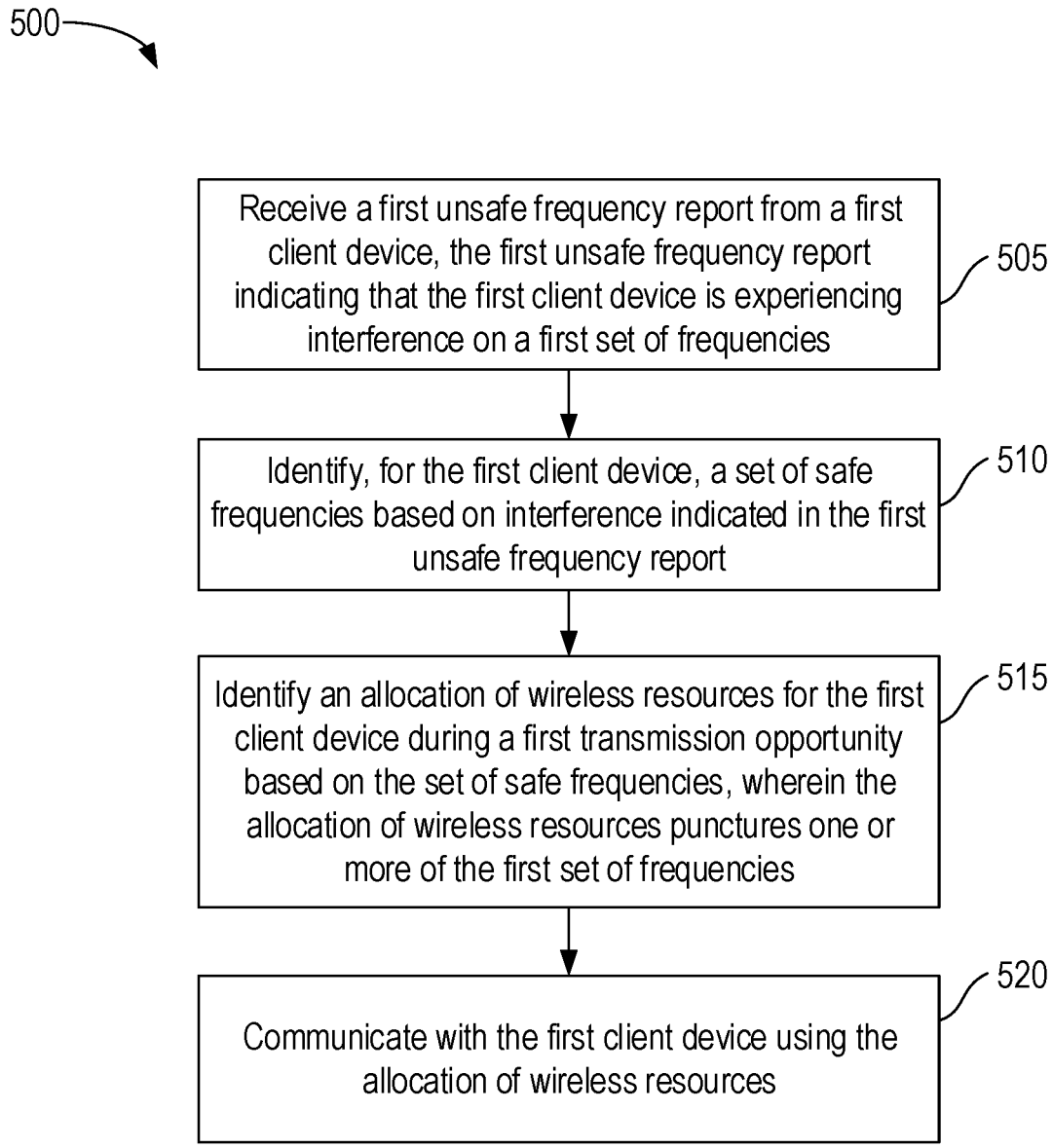
FIG. 5 is a flow diagram depicting an example method for improved dynamic puncturing, according to some embodiments of the present disclosure.

FIG. 5 is a flow diagram depicting an example method 500 for improved dynamic puncturing, according to some embodiments of the present disclosure. In some embodiments, the method 500 is performed by an AP, such as an AP 110 of FIG. 1.

At block 505, a first unsafe frequency report is received from a first client device (e.g., a client device 115 of FIG. 1), the first unsafe frequency report indicating that the first client device is experiencing interference on a first set of frequencies (e.g., due to a base station 105 of FIG. 1).

At block 510, a set of safe frequencies is identified, for the first client device, based on interference indicated in the first unsafe frequency report (e.g., based on threshold interference severity).

At block 515, an allocation of wireless resources is identified for the first client device during a first transmission opportunity based on the set of safe frequencies, wherein the allocation of wireless resources punctures one or more of the first set of frequencies.

At block 520, the first client device is communicated with using the allocation of wireless resources.

Figure 6:
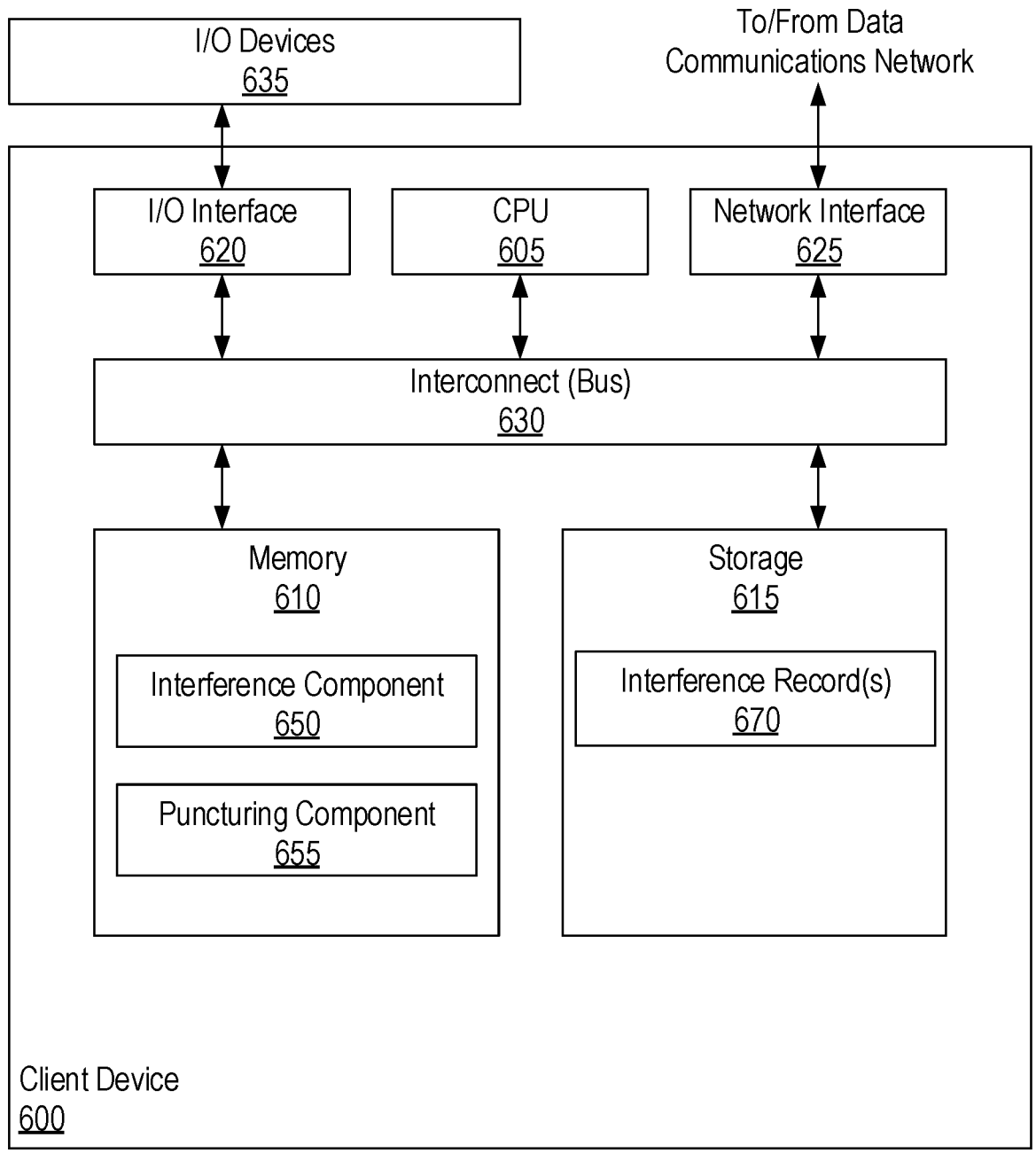
FIG. 6 depicts an example computing device configured to perform various aspects of the present disclosure, according to some embodiments of the present disclosure.

FIG. 6 depicts an example computing device (e.g., a client device 600) configured to perform various aspects of the present disclosure, according to some embodiments of the present disclosure. In some embodiments, the client device 600 corresponds to a client device 115 of FIG. 1. Although depicted as a physical device, in embodiments, the client device 600 may be implemented using virtual device(s), and/or across a number of devices (e.g., in a cloud environment).

As illustrated, the client device 600 includes a CPU 605, memory 610, storage 615, a network interface 625, and one or more I/O interfaces 620. In the illustrated embodiment, the CPU 605 retrieves and executes programming instructions stored in memory 610, as well as stores and retrieves application data residing in storage 615. The CPU 605 is generally representative of a single CPU and/or GPU, multiple CPUs and/or GPUs, a single CPU and/or GPU having multiple processing cores, and the like. The memory 610 is generally included to be representative of a random access memory. Storage 615 may be any combination of disk drives, flash-based storage devices, and the like, and may include fixed and/or removable storage devices, such as fixed disk drives, removable memory cards, caches, optical storage, network attached storage (NAS), or storage area networks (SAN).

In some embodiments, I/O devices 635 (such as keyboards, monitors, etc.) are connected via the I/O interface(s) 620. Further, via the network interface 625, the client device 600 can be communicatively coupled with one or more other devices and components (e.g., via a network, which may include the Internet, local network(s), and the like). As illustrated, the CPU 605, memory 610, storage 615, network interface(s) 625, and I/O interface(s) 620 are communicatively coupled by one or more buses 630.

In the illustrated embodiment, the memory 610 includes an interference component 650 and a puncturing component 655, which may perform one or more embodiments discussed above. Although depicted as discrete components for conceptual clarity, in embodiments, the operations of the depicted components (and others not illustrated) may be combined or distributed across any number of components. Further, although depicted as software residing in memory 610, in embodiments, the operations of the depicted components (and others not illustrated) may be implemented using hardware, software, or a combination of hardware and software.

In one embodiment, the interference component 650 may be used to detect and/or quantify interference to the use of a WLAN by the client device 600, as discussed above. For example, the interference component 650 may use various techniques to detect or identify specific frequencies (e.g., sub-channels) of the WLAN that are affected by interference, such as due to cellular networks. This interference may then be reported to the AP (e.g., in the form of an unsafe frequency report).

Generally, the puncturing component 655 may be used to perform dynamic puncturing when communicating with APs, as discussed above. For example, the puncturing component 655 may monitor incoming downlink data from the AP to determine whether dynamic puncturing is being applied. If so, the puncturing component 655 may use corresponding puncturing when uplink data is transmitted, from the client device 600, to the AP.

In the illustrated example, the storage 615 includes interference records 670. In some embodiments, the interference records 670 indicate historical interference (e.g., prior unsafe frequency reports) for the client device 600. Although depicted as residing in storage 615, the interference records 670 may be stored in any suitable location, including memory 610. Additionally, in some embodiments, the client device 600 may refrain from storing or maintaining the historical interference records 670. In at least one embodiment, the interference records 670 correspond to the current set of unsafe frequencies, such that the client device 600 can respond rapidly if or when an AP requests an unsafe frequency report (without the need to re-evaluate the wireless interference).

Figure 7:
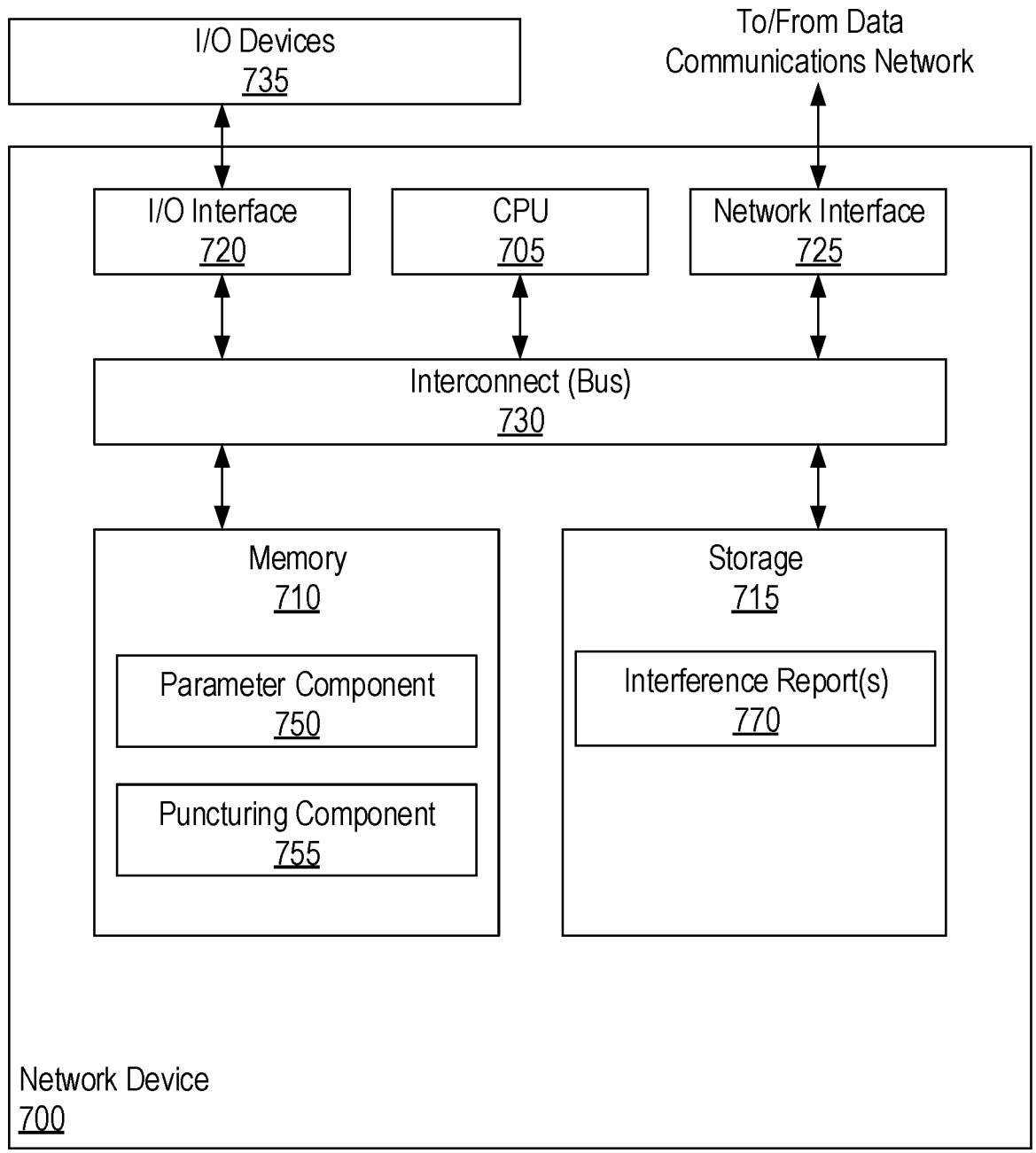
FIG. 7 depicts an example computing device configured to perform various aspects of the present disclosure, according to some embodiments of the present disclosure.

FIG. 7 depicts an example computing device (e.g., a network device 700) configured to perform various aspects of the present disclosure, according to some embodiments of the present disclosure. In some embodiments, the network device 700 corresponds to an AP 110 of FIG. 1. Although depicted as a physical device, in embodiments, the network device 700 may be implemented using virtual device(s), and/or across a number of devices (e.g., in a cloud environment).

As illustrated, the network device 700 includes a CPU 705, memory 710, storage 715, a network interface 725, and one or more I/O interfaces 720. In the illustrated embodiment, the CPU 705 retrieves and executes programming instructions stored in memory 710, as well as stores and retrieves application data residing in storage 715. The CPU 705 is generally representative of a single CPU and/or GPU, multiple CPUs and/or GPUs, a single CPU and/or GPU having multiple processing cores, and the like. The memory 710 is generally included to be representative of a random access memory. Storage 715 may be any combination of disk drives, flash-based storage devices, and the like, and may include fixed and/or removable storage devices, such as fixed disk drives, removable memory cards, caches, optical storage, network attached storage (NAS), or storage area networks (SAN).

In some embodiments, I/O devices 735 (such as keyboards, monitors, etc.) are connected via the I/O interface(s) 720. Further, via the network interface 725, the network device 700 can be communicatively coupled with one or more other devices and components (e.g., via a network, which may include the Internet, local network(s), and the like). As illustrated, the CPU 705, memory 710, storage 715, network interface(s) 725, and I/O interface(s) 720 are communicatively coupled by one or more buses 730.

In the illustrated embodiment, the memory 710 includes a parameter component 750 and a puncturing component 755, which may perform one or more embodiments discussed above. Although depicted as discrete components for conceptual clarity, in embodiments, the operations of the depicted components (and others not illustrated) may be combined or distributed across any number of components. Further, although depicted as software residing in memory 710, in embodiments, the operations of the depicted components (and others not illustrated) may be implemented using hardware, software, or a combination of hardware and software.

In one embodiment, the parameter component 750 may be used to determine or generate dynamic puncturing parameters based on unsafe frequency reports, as discussed above. For example, the parameter component 750 may receive and aggregate unsafe frequency reports to quantify the interference, identify affected devices and corresponding frequencies, and the like. Based on various criteria (e.g., threshold severity), the parameter component 750 may generate parameters (specific to each client device) to puncture zero or more frequencies when communicating with each associated client device.

Generally, the puncturing component 755 may be used to perform dynamic puncturing when communicating with client devices, as discussed above. For example, the puncturing component 655 may determine, for each client device, whether and how to puncture transmissions to the client device, as discussed above (e.g., based on the parameters generated by the parameter component 750).

In the illustrated example, the storage 715 includes a set of interference reports 770 (e.g., unsafe frequency reports from each client device). In some embodiments, the interference reports 770 can include the individual reports and/or aggregated data based on the reports. In some embodiments, the interference reports 770 can include reports transmitted or provided to other network devices (e.g., other APs), as discussed above. Although depicted as residing in storage 715, the interference reports 770 may be stored in any suitable location, including memory 710.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," or "at least one of A or B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method, or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method, comprising:
receiving, by a wireless access point (AP) of a set of wireless APs, a first unsafe frequency report from a first client device, the first unsafe frequency report indicating that the first client device is experiencing interference on a first set of frequencies;
identifying, for the first client device, a set of safe frequencies based on interference indicated in the first unsafe frequency report; and
performing dynamic puncturing based on the first unsafe frequency report, comprising:
identifying, by a multi-AP coordinator, an allocation of wireless resources for the first client device during a first transmission opportunity based on the set of safe frequencies and a set of unsafe frequency reports for the set of wireless APs, wherein the allocation of wireless resources punctures one or more of the first set of frequencies; and
communicating with the first client device using the allocation of wireless resources.

2. The method of claim 1, further comprising:
receiving, by the wireless AP, a set of unsafe frequency reports from a set of client devices; and
performing dynamic puncturing based on the set of unsafe frequency reports.

3. The method of claim 1, wherein the allocation of wireless resources punctures the one or more of the first set of frequencies for each wireless AP of the set of wireless APs.

4. The method of claim 1, wherein identifying the set of safe frequencies comprises identifying, based on the first unsafe frequency report, that interference on each respective frequency of the set of safe frequencies is satisfies one or more criteria.

5. The method of claim 1, wherein the first unsafe frequency report is provided by the first client device upon association to the wireless AP.

6. The method of claim 1, further comprising:
receiving, by the wireless AP, an updated unsafe frequency report from the first client device; and
performing dynamic puncturing based on the updated unsafe frequency report.

7. The method of claim 6, wherein the first client device transmitted the updated unsafe frequency report in response to determining that interference experienced by the first client device has changed.

8. The method of claim 6, wherein the first client device transmitted the updated unsafe frequency report in response to a query transmitted, by the wireless AP, to the first client device.

9. The method of claim 1, wherein performing dynamic puncturing based on the first unsafe frequency report further comprises:
generating a second allocation of wireless resources for a second client device during the first transmission opportunity, wherein the second allocation of wireless resources does not puncture the first set of frequencies; and
communicating with the second client device using the second allocation of wireless resources.

10. A non-transitory computer-readable medium containing computer program code that, when executed by operation of one or more computer processors, performs an operation comprising:
receiving, by a wireless access point (AP) of a set of wireless APs, a first unsafe frequency report from a first client device, the first unsafe frequency report indicating that the first client device is experiencing interference on a first set of frequencies;
identifying, for the first client device, a set of safe frequencies based on interference indicated in the first unsafe frequency report; and
performing dynamic puncturing based on the first unsafe frequency report, comprising:
identifying, by a multi-AP coordinator, an allocation of wireless resources for the first client device during a first transmission opportunity based on the set of safe frequencies and a set of unsafe frequency reports for the set of wireless APs, wherein the allocation of wireless resources punctures one or more of the first set of frequencies; and
communicating with the first client device using the allocation of wireless resources.

11. The non-transitory computer-readable medium of claim 10, the operation further comprising:
receiving, by the wireless AP, a set of unsafe frequency reports from a set of client devices; and
performing dynamic puncturing based on the set of unsafe frequency reports.

12. The non-transitory computer-readable medium of claim 10, wherein identifying the set of safe frequencies comprises identifying, based on the first unsafe frequency report, that interference on each respective frequency of the set of safe frequencies is satisfies one or more criteria.

13. The non-transitory computer-readable medium of claim 10, the operation further comprising:
receiving, by the wireless AP, an updated unsafe frequency report from the first client device; and
performing dynamic puncturing based on the updated unsafe frequency report.

14. The non-transitory computer-readable medium of claim 13, wherein the first client device transmitted the updated unsafe frequency report in response to determining that interference experienced by the first client device has changed.

15. The non-transitory computer-readable medium of claim 10, wherein performing dynamic puncturing based on the first unsafe frequency report further comprises:
generating a second allocation of wireless resources for a second client device during the first transmission opportunity, wherein the second allocation of wireless resources does not puncture the first set of frequencies; and
communicating with the second client device using the second allocation of wireless resources.

16. A system, comprising:
one or more computer processors; and
a memory containing a program which when executed by the one or more computer processors performs an operation, the operation comprising:
receiving, by a wireless access point (AP) of a set of wireless APs, a first unsafe frequency report from a first client device, the first unsafe frequency report indicating that the first client device is experiencing interference on a first set of frequencies;
identifying, for the first client device, a set of safe frequencies based on interference indicated in the first unsafe frequency report; and
performing dynamic puncturing based on the first unsafe frequency report, comprising:
identifying, by a multi-AP coordinator, an allocation of wireless resources for the first client device during a first transmission opportunity based on the set of safe frequencies, wherein the allocation of wireless resources punctures one or more of the first set of frequencies and a set of unsafe frequency reports for the set of wireless APs; and
communicating with the first client device using the allocation of wireless resources.

17. The system of claim 16, the operation further comprising:
receiving, by the wireless AP, a set of unsafe frequency reports from a set of client devices; and
performing dynamic puncturing based on the set of unsafe frequency reports.

18. The system of claim 16, wherein identifying the set of safe frequencies comprises identifying, based on the first unsafe frequency report, that interference on each respective frequency of the set of safe frequencies is satisfies one or more criteria.

19. The system of claim 16, the operation further comprising:
receiving, by the wireless AP, an updated unsafe frequency report from the first client device; and
performing dynamic puncturing based on the updated unsafe frequency report.

20. The system of claim 16, wherein performing dynamic puncturing based on the first unsafe frequency report further comprises:
generating a second allocation of wireless resources for a second client device during the first transmission opportunity, wherein the second allocation of wireless resources does not puncture the first set of frequencies; and
communicating with the second client device using the second allocation of wireless resources.

* * * * *